United States Patent [19]
Van Haag

[11] Patent Number: 5,823,927
[45] Date of Patent: Oct. 20, 1998

[54] DEFLECTION CONTROLLABLE ROLLER FOR USE IN CALENDER

[75] Inventor: Rolf Van Haag, Kerken, Germany

[73] Assignee: Voith Sulzer Finishing GmbH, Krefeld, Germany

[21] Appl. No.: 736,355

[22] Filed: Oct. 23, 1996

[30] Foreign Application Priority Data

Nov. 2, 1995 [DE] Germany ................ 195 40 791.1

[51] Int. Cl.$^6$ ................................................ B23P 15/00
[52] U.S. Cl. ................................ 492/7; 492/5; 492/20
[58] Field of Search .............................. 492/7, 16, 20, 492/2, 5

[56] References Cited

U.S. PATENT DOCUMENTS

| | | | |
|---|---|---|---|
| 3,587,152 | 6/1971 | Hold ........................................... | 29/116 |
| 4,212,504 | 7/1980 | Krylov . | |
| 5,101,544 | 4/1992 | Kubik ......................................... | 492/7 |
| 5,111,565 | 5/1992 | Beaureault et al. ........................ | 492/7 |
| 5,189,776 | 3/1993 | Küsters ....................................... | 492/7 |
| 5,206,978 | 5/1993 | Pav ............................................. | 492/5 |
| 5,338,279 | 8/1994 | Schiel ......................................... | 492/2 |
| 5,447,605 | 9/1995 | Roerig ................................... | 162/358.3 |
| 5,628,717 | 5/1997 | Van Haag ................................... | 492/7 |
| 5,650,048 | 7/1997 | Swietlik .............................. | 162/358.3 |

FOREIGN PATENT DOCUMENTS

| | | |
|---|---|---|
| 0 384 173 A | 11/1986 | European Pat. Off. . |
| 0 347 549 A2 | 6/1988 | European Pat. Off. . |
| 30 22 491 | 1/1983 | Germany . |
| 38 20 974 | 4/1990 | Germany . |
| 40 11 826 C1 | 4/1990 | Germany . |
| 44 29 499 | 11/1995 | Germany . |

*Primary Examiner*—Irene Cuda
*Attorney, Agent, or Firm*—Darby & Darby

[57] ABSTRACT

A deflection controllable roller has as an on-off valve disposed in each of a plurality of discharge lines. The on-off valve opens only toward the discharge side. The discharge side of the on-off valve is alternately pressurized with an opening pressure that is less than an internal chamber pressure or with a cut-off pressure that is greater than the internal chamber pressure. The on-off valves are located directly in the bearing device and are, therefore, relatively easily controlled.

4 Claims, 1 Drawing Sheet

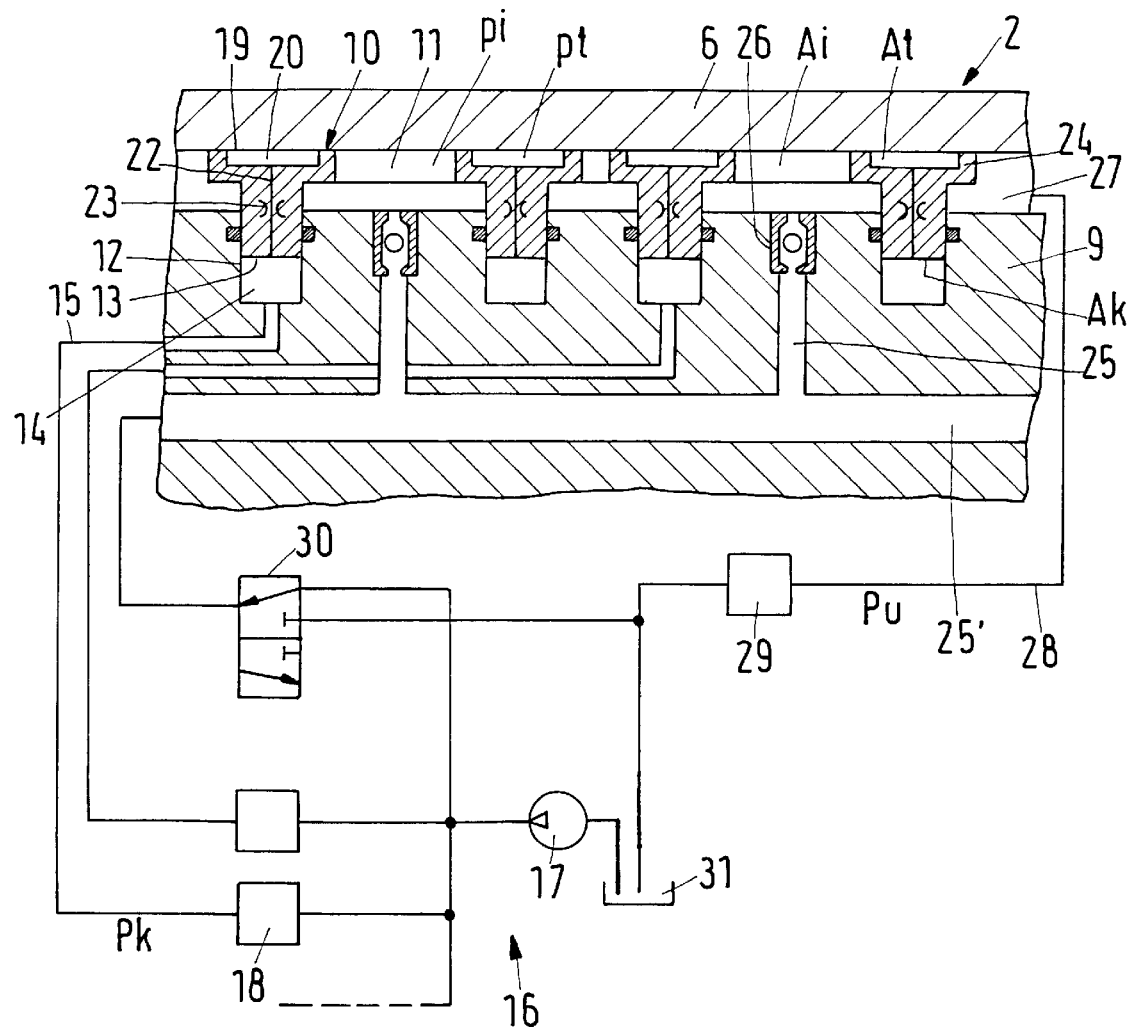

DEFLECTION CONTROLLABLE ROLLER FOR USE IN CALENDER

BACKGROUND OF THE INVENTION

1. Field of the Invention

The present invention relates to a deflection controllable roller for use in a calender. More specifically, the present invention relates to a deflection controllable roller having a roller covering. The roller covering is supported by hydrostatic support elements, which are mounted on a bearing device that is disposed within the roller covering. The bearing device is fixedly mounted. The support elements have at least one pocket in their support surface, which faces the inner surface of the covering. The support elements also have at least one pressure surface, which faces the bearing device. A pressure chamber is formed between the pressure surface and the bearing device. The pressure chamber is fluidly connected to a pressure feed line and, through a throttle, to the pocket. The support elements are constructed as ring elements having a ring-shaped pocket and a ring-shaped pressure surface. An interior chamber that is enclosed by the ring element is connected to a discharge line. An on-off valve, which has only one closed position and one open position, is disposed in the discharge line.

2. Discussion of the Related Art

German Reference DE 44 29 499 C1, which corresponds to pending U.S. patent application Ser. No. 08/513,426, now U.S. Pat. No. 5,628,717, discloses a roller that permits a broad adjustment range for the support force and uses only one pressure feed line and one discharge line for each support element. The disclosure of German Reference DE 44 29 499 C1 and pending U.S. patent application Ser. No. 08/513,426, filed on Aug. 10, 1995, are hereby incorporated by reference.

SUMMARY OF THE INVENTION

It is an object of the present invention to provide a simple and reliable way to adjust the pressure in an internal chamber of the support elements.

This object is achieved in accordance with the present invention with an on-off valve disposed in each of the individual discharge lines (e.g., a flap valve), which valves open toward the discharge side. In other words, the on-off valves act as a one way check valve that permits fluid to flow only toward the discharge line. The valve preferably operates in either a completely open or a completely closed position. Thus, relatively simple valves can be used.

The discharge side of the on-off valves can alternately be pressurized with an opening pressure that is less than the internal chamber pressure or with a cut-off pressure that is greater than the internal chamber pressure. Therefore, the on-off valve is completely hydraulically actuated. If the opening pressure is present on the discharge side, pressure fluid can flow out of the internal chamber and there will be a correspondingly lower internal chamber pressure. But if the discharge side is pressurized with the cut-off pressure, the on-off valve closes and the internal chamber pressure assumes a value that approximates the pocket pressure. No additional control lines are needed. The controlling pressure is actuated solely through the discharge line.

The discharge lines of a group of support elements, whose pressure chambers can be individually supplied with pressure, are connected to a common discharge line. The common discharge line is alternately connected by a change-over switch to either a pressure sink that maintains an opening pressure, which is lower than the minimum internal chamber pressure, or to a pressure source that maintains a cut-off pressure, which is higher than the maximum internal chamber pressure. An on-off valve is disposed in each individual discharge line. When the cut-off pressure is supplied, all the on-off valves close, which decouples the internal chambers of the support elements from each other with regard to pressure. The pressure of the internal chambers, therefore, follows the individual pressure adjustment of the pressure supplied through the pressure feed line.

The common discharge line is preferably formed by an axial bore in the bearing. The transversely (i.e., radially) extending individual discharge lines, in which the on-off valves are inserted, open into the axial bore. Because the flap valves need not be accessible and may also be very small, they can be located without difficulty in the transversely extending individual discharge lines. Therefore, a multiplicity of individual discharge lines need not run in the longitudinal (i.e., axial) direction of the bearing device. A common discharge line with a somewhat larger diameter is sufficient for all of the individual discharge lines.

The change-over switch is preferably disposed outside of the bearing device because the change-over switch only needs to be connected with the common discharge line.

BRIEF DESCRIPTION OF THE DRAWING FIGURE

The above and still further objects, features and advantages of the present invention will become apparent upon consideration of the following detailed description of a specific embodiment thereof, especially when taken in conjunction with the accompanying drawing wherein:

The single illustration shows a partial longitudinal sectional view through a roller in accordance with the present invention along with its associated fluid control circuit being shown schematically.

DETAILED DESCRIPTION OF THE PREFERRED EMBODIMENT

Referring now to the sole drawing FIGURE, a roller 2, which includes a roller covering 6, is illustrated. Covering 6 is rotatably supported by means of a plurality of support elements 10 that are mounted on a bearing device 9. Bearing device 9 is fixed in position (i.e., bearing device 9 does not rotate).

Each support element 10 is ring shaped and surrounds an internal chamber 11. It is to be noted that element 10 is not disposed about the longitudinal axis of roller 2. Instead, element 10 is in the shape of a closed loop that is disposed on the outer periphery of bearing device 9. Each support element 10 is disposed in a ring groove 12 within bearing device 9. A pressure chamber 14 is delimited by a pressure surface 13 of the support element 10 and the interior walls of the ring groove 12. Chamber 14 is connected through a feed line 15 to a pressure fluid source 16. Pressure fluid source 16 is represented in the illustrated embodiment by a pump 17 and a pressure control valve 18.

Pressure fluid at an individually selectable pressure is conveyed through feed lines 15 to the individual support elements 10. Thus, each support element 10 can be supplied with pressure at an individual, predetermined value with respect to the other support elements.

Support element 10 has a support surface 19 facing the internal surface of the roller covering 6. A ring-shaped pocket 20 is disposed in surface 19. Pocket 20 essentially completely surrounds internal chamber 11. Pocket 20 is divided by narrow transverse ridges into multiple pocket sections, as disclosed in U.S. Pat. No. 5,628,717. Each pocket section is connected to the pressure chamber 14 through a line 22 that is provided with a throttle 23. Pocket surface At is somewhat larger than pressure surface Ak. To compensate for this difference in the pressure surfaces, support element 10 has an enlargement 24 in the pocket area.

The internal chamber 11 of each support element 10 has a cross-sectional area Ai and is connected, through a discharge line 25 that extends radially through the bearing device 9, to a common discharge line 25'. Discharge line 25' is formed by an axial bore within bearing device 9. A flap valve 26, which opens only towards the discharge side (i.e., fluid is only permitted to flow toward the discharge line) and functions as an on-off valve, is installed in each discharge line 25. A change-over switch 30 that alternately pressurizes the discharge side of the flap valves 26 with a cut-off pressure from a pressure source, or with an opening pressure from a pressure sink is connected to the common discharge line 25' outside of bearing device 9. The pressure source is pump 17 and the pressure sink is reservoir 31.

A flap valve 26 corresponds with each internal chamber 11 to ensure that the internal chamber pressure pi of each of the individual support elements 10 are decoupled from each other and can therefore follow the pocket pressure pt of the applicable support element 10. If a flap valve was used that is common to all the support elements (e.g., the flap valve is disposed in the common discharge line 25') such a decoupling of the support element would be impossible.

An intermediate chamber 27, disposed outside of the support elements, is connected to reservoir 31 through a return line 28, which is provided with a pressure control valve 29. Consequently, a pressure pu can be maintained in the intermediate chamber 27.

The following operating modes are now possible:

(1) The changeover switch 30 is in a first position (not illustrated), causing the flap valves 26 to close. The individual pocket pressure pt acts through the large surface At+Ai of the support element 10. That pressure can be adjusted for each support element 10 by means of the pressure control valve arrangement 18; or (2) The change-over switch 30 is in the second, illustrated position, causing the flap valves 26 to open. The support elements 10 act only on the relatively small surface At. The respective support force is correspondingly small, but it can be individually adjusted.

In both cases, pressure in the intermediate chamber 27 can be set anywhere from zero (0) to any other value, as described in U.S. Pat. No. 5,628,717.

Having described the presently preferred exemplary embodiment of a deflection controllable roller for use in a calender in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. A deflection-controllable roller for use in a calender comprising:

a fixed bearing device;

a plurality of support elements being mounted on said bearing device;

a roller covering being supported on said bearing device by said plurality of support elements, said roller covering having an inner surface facing said bearing device;

wherein each of said plurality of support elements has a ring-shaped support surface facing said inner surface of said roller covering, at least one ring-shaped pocket being disposed in said support surface, each of said plurality of support elements has a pressure surface facing said bearing device to delimit a pressure chamber therebetween, said pressure chamber being in fluid communication with a pressure feed line, said pressure chamber is also in fluid communication, through a throttle, with said at least one pocket;

an interior chamber being enclosed by each of said plurality of support elements, each of said interior chambers being in fluid communication with a discharge line; and a one-way check valve being disposed in each of said discharge lines, each of said check valves being selectively operative in one of an open position and a closed position, a discharge side of each of said check valves being selectively pressurized with one of an opening pressure that is less than a pressure within said respective internal chamber and a cut-off pressure that is greater than said pressure within said respective internal chamber.

2. The roller according to claim 1, wherein said discharge lines are in fluid communication with a common discharge line, further comprising a change-over switch being disposed in said common discharge line to alternately fluidly connect said discharge lines to a pressure sink that maintains said opening pressure lower than a minimum internal chamber pressure and with a pressure source that maintains said cut-off pressure higher than a maximum internal chamber pressure.

3. The roller according to claim 2, wherein said common discharge line is an axial bore in said bearing device, each of said discharge lines extending radially within said bearing device and being open into said common discharge line.

4. The roller according to claim 3, wherein said change-over switch is disposed outside of said bearing device.

* * * * *